United States Patent [19]
Hartig, Jr. et al.

[11] 3,912,179
[45] Oct. 14, 1975

[54] GRINDING MILL FOR NUTS

[75] Inventors: John W. Hartig, Jr.; Casper W. Showalter, both of Scottsdale, Ariz.

[73] Assignee: Butternut Corporation, Phoenix, Ariz.

[22] Filed: May 1, 1974

[21] Appl. No.: 466,003

[52] U.S. Cl............................. 241/248; 241/260.1
[51] Int. Cl.²......................................... B02C 2/00
[58] Field of Search ........ 241/168, 169.1, 248, 260, 241/260.1

[56] References Cited
UNITED STATES PATENTS

| | | | |
|---|---|---|---|
| 477,083 | 6/1892 | Thorn | 241/169.1 |
| 625,394 | 5/1899 | Hook | 241/260.1 |
| 625,400 | 5/1899 | Lambert | 241/260.1 X |
| 1,675,067 | 6/1928 | Tschantz | 241/248 |
| 2,838,794 | 7/1958 | Munger et al. | 241/260.1 X |
| 3,102,694 | 9/1963 | Frenkel | 241/260.1 X |
| 3,221,999 | 12/1965 | Cumpston, Jr. | 241/260 X |

*Primary Examiner*—Granville Y. Custer, Jr.
*Assistant Examiner*—Howard N. Goldberg
*Attorney, Agent, or Firm*—Warren F. B. Lindsley

[57] ABSTRACT

A grinding mill for home use designed for nuts in which the nuts are crushed, ground and pulverized in an improved manner utilizing the natural oils of the nut to form a product of a butter-like consistency.

9 Claims, 7 Drawing Figures

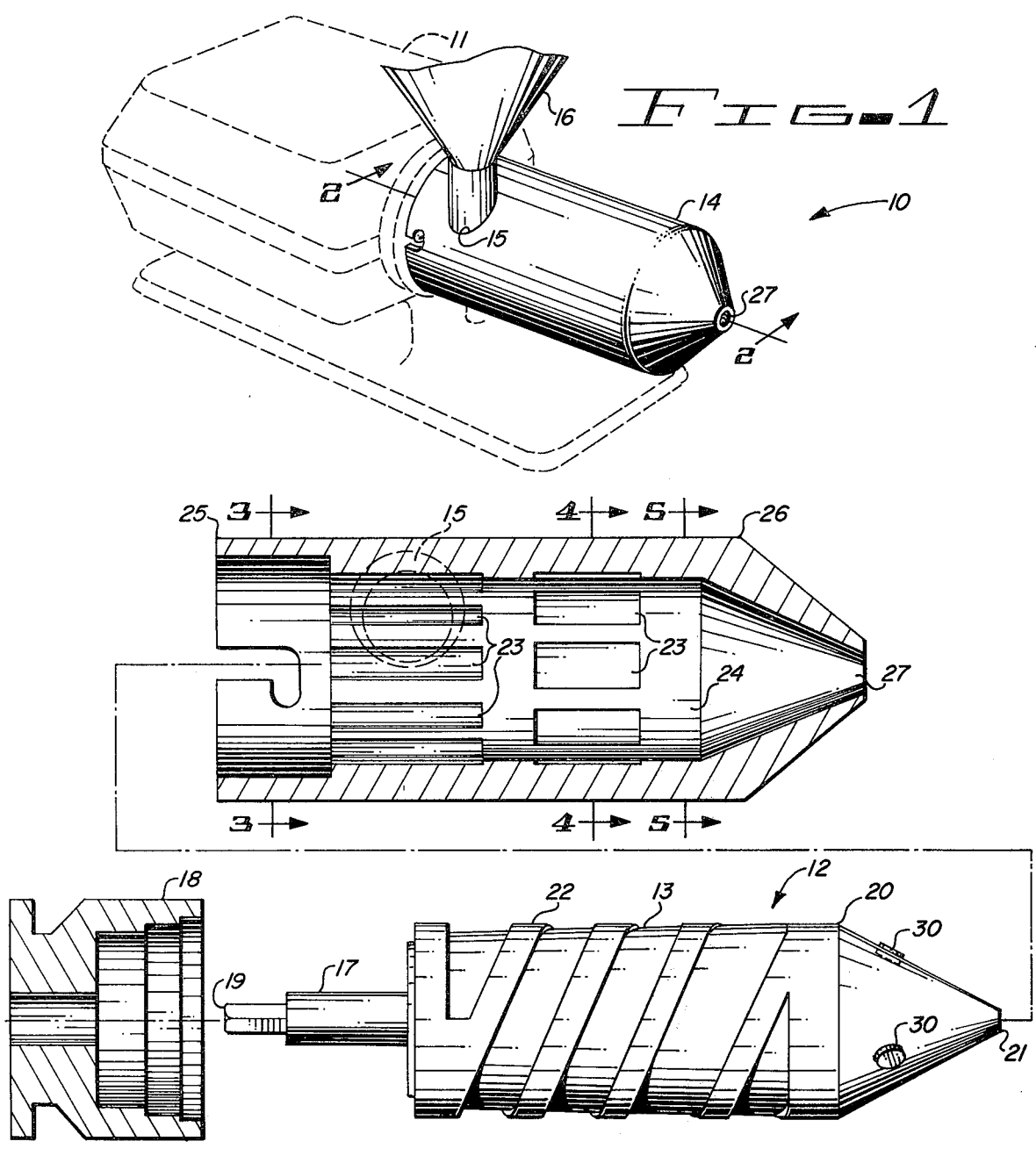
FIG-1
FIG-2
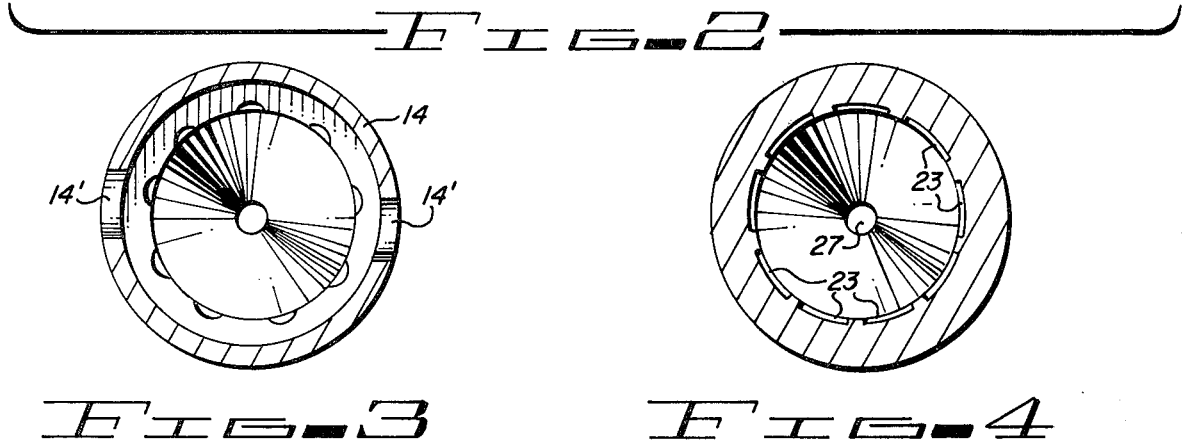
FIG-3
FIG-4

GRINDING MILL FOR NUTS

BACKGROUND OF THE INVENTION

Nutrition is the science which deals with the materials which the living organism takes in from its environment, and with the process through which these materials maintain life, promote health and growth, and sustain all the activities of the organism. Food is the source of these nutritive materials and supply all the elements which enter into the structure of the living body to afford the energy for its activities and to regulate the vital processes.

The preparation of food has a great deal to do with its nutritive value and ease and pleasure with which it is consumed and digested, and some changes of the food to make it more palatable destroys its nutritive value.

Nuts, whether of the tree or ground variety, are of considerable nutritive value and are easily digested if ground into a butter-like consistency utilizing their own oils as a lubricant for the butter-like spread.

The demand for nuts is constantly growing and with it the desire to prepare various food products directly from raw, natural materials, thereby eliminating the commercial additives objected to by a growing number of people. Since the desire to use nuts as a source of protein and fat with some nuts also providing starch, sugar and dextrin is increasing, the need for a suitable grinding mill is evident.

FIELD OF THE INVENTION

This invention is particularly directed to grinding mills, and more particularly, to a home and commercial appliance which will grind nuts and seeds to a smooth butter-like consistency.

DESCRIPTION OF THE PRIOR ART

Many types of grinding mills have been provided for home and industry but none have been able in a simple mechanical structure economically manufactured to grind nuts, such as peanuts, walnuts and the like into a smooth butter-like consistency lubricated by its own oils without heat, undue pressure and additives which might destroy the nutritive value of the food products. Further, a need exists for a grinding mill which may be used daily as needed to furnish the ground products without undue loss of time or trouble.

Prior art attempts in home appliances, particularly, have resulted in more of a chopping and cutting action than a smooth grinding milling action which would product the natural oils of the product for the lubricant of the resulting smooth butter-like spread.

SUMMARY OF THE INVENTION

It is, therefore, the principle object of this invention to provide an appliance for home or small business use which will readily grind or mill food products such as seeds and nuts into a butter-like consistency utilizing its own natural oils.

Another object of this invention is to provide a grinding mill for small appliance use which gradually crushes, grinds and pulverizes the product into its final consistency.

A further object of this invention is to provide a grinding mill lubricated by the product it is milling.

A still further object of this invention is to provide a simple, inexpensive cylindrical grinding machine for nuts which may be used equally well for small or large grinding operations.

A still further object of this invention is to provide an improved grinding mill head which is usable in large or small grinding mill appliances.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

FIG. 1 is a perspective view of a grinding mill embodying the invention;

FIG. 2 is an exploded cross-sectional view of FIG. 1 taken along the line 2—2;

FIG. 3 is a cross-sectional view of FIG. 2 taken along the line 3—3;

FIG. 4 is a cross-sectional view of FIG. 2 taken along the line 4—4;

DESCRIPTION OF THE PREFERRED EMBODIMENT

Figure 5:
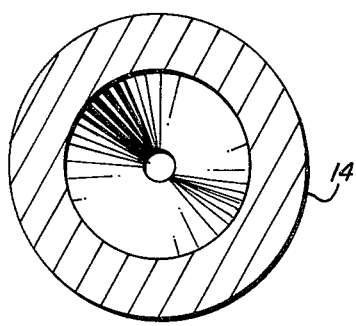
FIG. 5 is a cross-sectional view of FIG. 2 taken along the line 5—5.

Referring more particularly to the drawings by characters of reference, FIG. 1 discloses an appliance 10 for grinding and milling seeds and nuts wherein the grinding and milling results in the withdrawing of the natural oils of the seeds and nuts to provide a lubrication of the resulting product so as to form a spreadable butter-like spread. As shown in FIG. 1, the appliance comprises a housing 11 for a power driving means such as an electric motor and suitable reduction gear means if needed. The power driving means is coupled to and rotates a rotor 12 contoured on its outer surface 13 for cooperating with the inside peripheral surface of rotor housing 14. Housing 14 is provided with an opening 15 for receiving a source of grindable material such as seeds and nuts. Opening 15 serves as a mounting means for a suitable hopper 16, the configuration of which is designed to feed a continuous stream of the product to the grinding mill formed by housing 14 and rotor 12.

Figure 7:
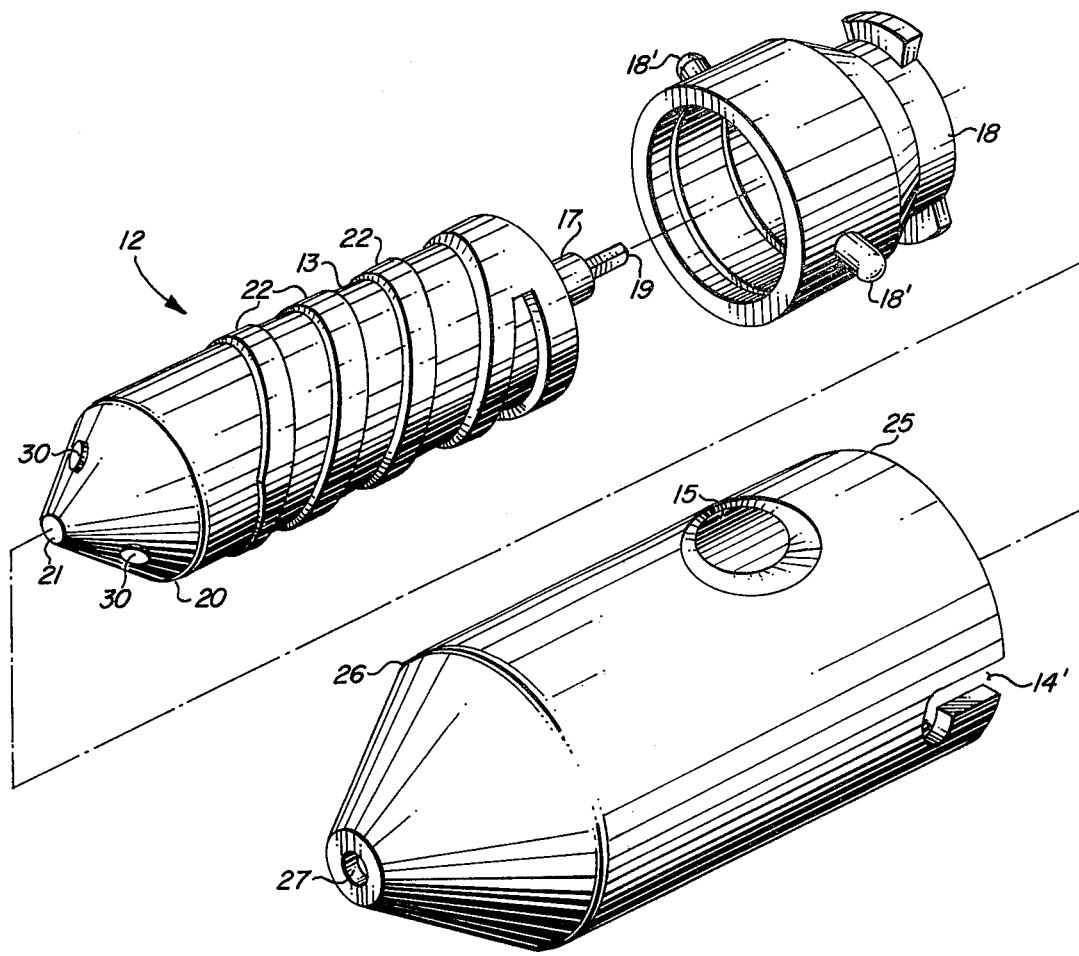
FIG. 7 is an exploded perspective view of the grinding mill head of the structure shown in FIG. 1 similar to FIG. 2 but illustrating more details thereof.

Rotor 12 comprises a drive shaft 17 which is fitted into a chuck 18 which in turn is mounted in housing 11 by means of prongs 18' fitting into slots 14' in housing 14, as shown in FIGS. 2 and 7. As heretofore mentioned, the free end 19 of shaft 17 may be directly connected to the rotor of an electric motor or through suitable reduction gears, if so desired.

The outer surface 13 of rotor 12 is provided with a geometrical configuration or outline which tapers outwardly from a first diameter at the point of engagement with drive shaft 17 to a slightly larger diameter at its end 20 at which point it tapers inwardly to a point 21.

The outer surface of rotor 12 is further provided with a screw thread like cutting and grinding surface 22 extending above the surface 13 of the rotor, as shown in FIG. 2, which cooperates with cutting and grinding surfaces 23 on the inside peripheral surface of the hollow housing 14 to perform the grinding and milling function of the appliance. Although the cutting and grinding surface 22 may have a suitable spiral configuration, other suitable corkscrew like configurations may be used providing the cutting and grinding surface together with the cutting and grinding surface 23 on housing 14 sequentially cuts, grinds and mills to a smaller and smaller particle size.

As noted from the inside configuration of the hollow opening in housing 14, the cutting and grinding surfaces 23 comprise a plurality of surfaces which are formed by forming indentations in the inside surface of housing 14 which may be rectangular in configuration extending inwardly of the surface 24 of the inside hollow configuration of housing 14 a predetermined distance. As shown in FIG. 2, these indentations extend along the housing in two groups spaced longitudinally of each other. The depth of the indentations are deeper at end 25 of housing 14 where the first group of indentations 23 are formed than at end 26 of the housing. Thus, the spacing between rotor 12 and the surface of the inside of housing 14 is greater at or near the point of entrance of the grinding and milling material through opening 15 than at the point of discharge through nozzle 27 formed between housing 14 and point 21 of the rotor 12 when the two parts are assembled together.

As the raw material is fed into housing 14 through opening 15, the seed and nut meats are fed into the spacing between the rotor and housing formed by the indentations 23 in housing 14 and the cutting and milling surfaces 22 of the rotor where they are cut, ground and milled into a first predetermined size. They are then moved by the spiral form of the surfaces 22 longitudinally of the housing where they are progressively milled and cut to smaller sizes during which time the oil ingredients of the product are at least partially pressed to the surface of the product to aid in forming a smooth or partially smooth butter-like consistency.

It should be recognized that the disclosed and claimed grinding mill is formed of merely a few parts, the grinding and milling portions of which may be quickly and easily assembled and disassembled with a minimum of effort after each use for cleaning, if so desired. Thus, the disclosed mill may be used daily as needed and the product used immediately thereby preserving its food values before they are dissipated into the air.

Figure 6:
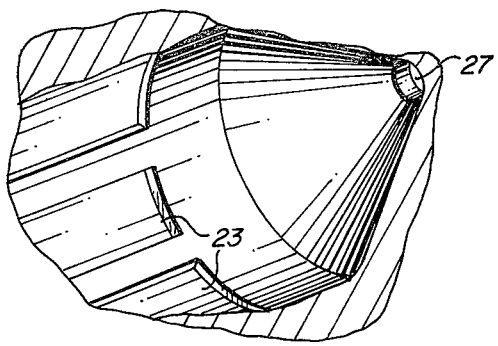
FIG. 6 is an enlarged partial perspective view of the head of the rotor of the grinding mill shown in FIG. 2 illustrating bearing inserts.

As shown in FIGS. 2 and 6 of the drawings, bearing pads 30 may be suitably affixed to the outside surface of the rotor adjacent the nozzle end thereof, if so desired. Although the appliance will function satisfactorily without them, three of the pads formed of Neoprene, Teflon or other suitable wear resistant meterial may be affixed to the outside surface of the rotor, as shown, to provide a longer life for the appliance. Further, a smoother operation of the structure with less vibratory action will result.

Although but one embodiment of the present invention has been illustrated and described, it will be apparent to those skilled in the act that various changes and modifications may be made therein without departing from the spirit of the invention or from the scope of the appended claims.

We claim:

1. A grinding mill for seed and nut meat materials comprising in combination:

a milling head comprising an elongated rotor having a first power driven end and a second end,
    an elongated hollow cylindrical housing,
    the hollow interior of said housing defining a cavity the shape of which is similar to the outer configuration of said rotor,
    the outer peripheral surface of said rotor being provided with a cutting and grinding means in the form of a spiral which extends from the power driven end of the rotor toward its second end for moving the material toward its second end,
    said cutting and grinding means extending above the outer peripheral surface of said rotor a predetermined distance,
    means for rotatably mounting the cutting and grinding means of said rotor in the hollow interior of said housing,
    the inside peripheral surface of said housing being provided with indentations along its length which cooperate with said grinding surfaces of said rotor for cutting, grinding and pressing the material being processed as it is moved by said spiral through said head,
    said indentations being of a rectangular configuration with their longest sides extending in the direction of the longitudinal axis of the housing,
    a first opening in said housing adjacent said second end of said rotor forming a nozzle for discharging the processed material of said head, and
    a second opening in said housing adjacent the power driven end of said rotor for receiving into said housing between said rotor and the inside peripheral surface of said housing the seed and nut meat materials to be processed.

2. The grinding mill set forth in claim 1 in further combination with:

power means connected to said power driven end of said rotor for rotating said rotor in said housing.

3. The portable grinding mill set forth in claim 1 wherein:

said nozzle is formed along the longitudinal axis of said housing.

4. The portable grinding mill set forth in claim 1 wherein:

the outer peripheral surface of said rotor gradually tapers outwardly from its power driven end toward its second end.

5. The portable grinding mill set forth in claim 1 in further combination with:

a hopper mounted on said housing for storing and directing into said second opening the material to be processed.

6. The portable grinding mill set forth in claim 1 wherein:

said indentations of said housing are substantially the same depth as the height of said grinding and cutting surfaces.

7. The portable grinding mill set forth in claim 1 wherein:

said indentations are spacedly arranged around the longitudinal axis of said housing.

8. The portable grinding mill set forth in claim 1 wherein:

said rectangular configurations are spacedly arranged around the longitudinal axis of said housing.

9. The portable grinding mill set forth in claim 1 wherein:

said rectangular configurations are arranged in two spaced groups along the longitudinal axis of said housing,
    each rectangular configuration of each of said groups being aligned with the others of said groups around the periphery of the inside surface of said housing.

* * * * *